United States Patent [19]
Fisher et al.

[11] 3,748,600
[45] July 24, 1973

[54] POWER COMBINING NETWORK

[75] Inventors: Reed Edward Fisher, Parsippany-Troy Hills Twp., Morris County; John Ineson Smith, Mendham, both of N.J.

[73] Assignee: Bell Telephone Laboratories, Incorporated, Murray Hill, N.J.

[22] Filed: Apr. 28, 1972

[21] Appl. No.: 248,701

[52] U.S. Cl. .................................. 333/10, 333/31 R
[51] Int. Cl. .................................................. H03h 7/46
[58] Field of Search ...................... 333/1.1, 6, 10, 11

[56] References Cited
UNITED STATES PATENTS

| | | | |
|---|---|---|---|
| 3,495,263 | 2/1970 | Amitay et al. | 333/10 X |
| 3,571,765 | 3/1971 | Friedman | 333/10 X |

*Primary Examiner*—Paul L. Gensler
*Attorney*—W. L. Keefauver

[57] ABSTRACT

If first and second noncoherent signals are combined in any simple hybrid network for application, for example, to a common antenna, each signal suffers a 3 dB loss. Furthermore, no simple phasing network suffices to obtain coherency if the signals are in nonoverlapping frequency bands. The present invention combines such signals by a network of hybrids and reflective reactive circuits that form third and fourth sum signals from the first and second. The resulting signals are now coherent and can be combined without loss. The reflective reactive circuit introduces a properly nonlinear phase characteristic that enhances the bandwidth over which the desired addition can be made.

5 Claims, 6 Drawing Figures

POWER COMBINING NETWORK

BACKGROUND OF THE INVENTION

This invention relates to power coupling networks and, more particularly, to networks for multiplexing or combining a number of channels of different frequency for application to a common load.

Most power combining networks of the prior art depend upon a coherency of the signals to be combined to avoid excessive loss or else they use narrow band multiplexing filters. For example, in a typical network using directional couplers and/or hybrids to combine two signals, a balance or cancellation of the two signals in one or more arms of the hybrid is relied upon. If the two signals are not of the same frequency or are otherwise noncoherent, each will suffer a 3 dB power loss because of failure of the balance. Early methods for eliminating this loss utilize narrow bandpass or band rejection filters, as for example, disclosed in W. D. Lewis U.S. Pat. No. 2,531,447, Nov. 28, 1950 or variations thereof as disclosed in the text "Principles and Applications of Waveguide Transmission" by G. C. Southworth, D. Van Nostrand Company, Inc. (1950) in Section 9.2.

A further network has recently been proposed that combines first and second different signals to produce sum (or difference) products between them. The resulting products are now identical, i.e., coherent, and can be combined without loss. One step in the process involves introducing a particular phase shift to the components of the first signal relative to those of the second by transmission filters.

The need for this phase shift is inherently band limiting even though the frequencies of the first and second signal are relatively widely spaced. For a description of such a system reference may be had to an article "Frequency Multiplexing of Antenna-Feeder Channels Without Using Resonators" by V. D. Kuznetsov in *Telecommunications*, Vol. 24, No. 7, 1970, at page 37. In the form visualized by this art, the bands that can be handled are relatively narrow and must be spaced relatively far apart.

SUMMARY OF THE INVENTION

In accordance with the present invention the bandwidth of an individual channel is increased and the minimum frequency spacing between adjacent channels is decreased in a channel combiner of the above-described type. This improvement is based upon the recognition that the optimum required phase shift cannot be obtained by transmission filter networks but can more closely be obtained over a broadband by reflection filter networks having the reflection characteristic of a simple resonant circuit. More particularly, the combiner in accordance with the invention comprises three similar directional couplers or hybrids, each having a first port and a pair of coupled ports in coupling relationship to the first port and a fourth port in conjugate relationship to the first port. Signals in the different frequency bands are applied respectively to the first port of each of the first and second of the directional couplers. Like resonant cavities, each having a resonant frequency between the two bands, are coupled by respective circulators so that signal components exiting from one of the coupled ports of each of the couplers are reflected by the cavities to the conjugate port of the other coupler. The third directional coupler has its coupled ports connected between the remaining coupled ports of said first and second directional couplers. It will be shown that the nonlinear frequency versus reflection characteristic of these cavities cooperate in a unique way with the transmission characteristics of the directional coupler network so that signals of the two bands very nearly combine in the remaining coupled port of the third directional coupler over a broadband and that the frequency spacing between the bands can be reduced to a small fraction of the bandwidth.

DETAILED DESCRIPTION

In the discussion which follows it will be convenient to consider the networks to be described from the standpoint of combining signals of different frequency for application to a common load. However, it should be understood that, with reversal of the direction of circulation of the signals, the network can be employed to separate signals of different frequency received from a common source.

Figure 1:
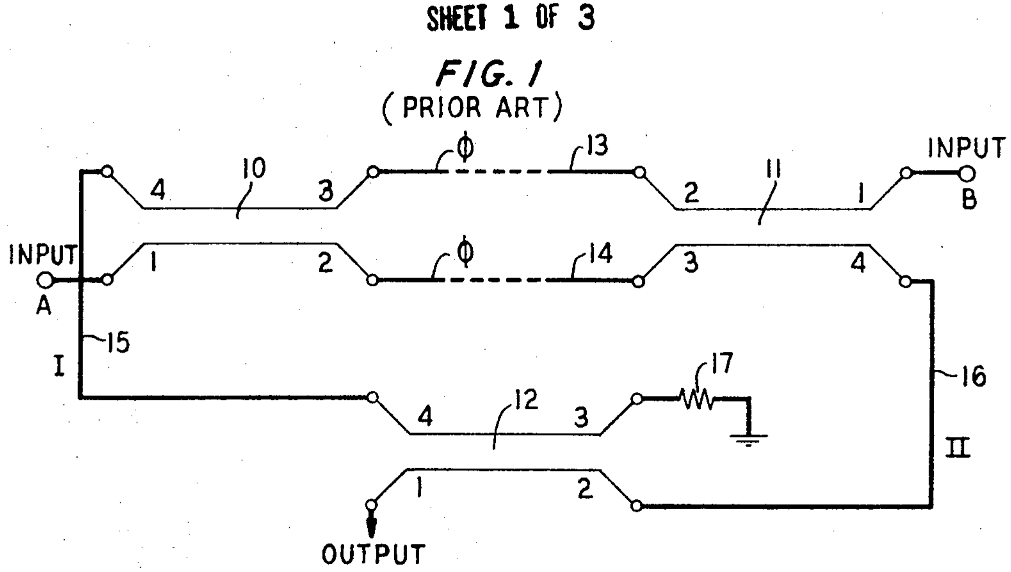
FIG. 1 (PRIOR ART)
FIG. 1 is a schematic, given for the purpose of explanation and comparison, of a combining network in accordance with the prior art.

Referring more particularly to FIG. 1, a channel combining network in accordance with the prior art is shown comprising directional couplers 10 and 11. The ports of each coupler are designated 1, 2, 3 and 4 and each has a coupling property such that power applied to port 1 appears in port 4 as a function of the coupling factor $\alpha$ and at port 2 as a function of $-j\sqrt{1-\alpha^2}$ with no power appearing at port 3. The powers at ports 4 and 2 are, therefore, 90 degrees out of phase. Ports 3 and 2 of each coupler are connected respectively to ports 2 and 3 of the other by relatively long sections of phase shift introducing transmission lines 13 and 14, each having a phase shift $\phi$ which because of the lengths of the lines is sufficiently different at spaced frequencies as will be defined hereinafter. A third coupler 12 has port 4 coupled to port 4 of coupler 10 by a transmission line 15 and port 2 thereof to port 4 of coupler 11 by transmission line 16, equal in length to line 15. Both lines 15 and 16 are short compared to lines 13 and 14 so that it may be assumed that the phase shift introduced at the spaced frequencies is not appreciably different.

Coupler 12 is preferably a 3 dB coupler so that voltage applied to port 1 appears at port 4 as a function of $1/\sqrt{2}$ and at port 2 as a function of $-j[1/\sqrt{2}]$. Thus, it will be recognized that if the signal at a point I in line 15 is equal in amplitude and 90° out of phase with the signal at an opposite and symmetrical point II in line 16, the signals will combine a port 1 of coupler 12 and no power will appear in ballast load 17 connected to port 3. The conditions necessary for the required equality at I and II are determined by considering separately the contributions of signals A and B applied respectively at the ports 1 of each of the couplers 10 and 11 as these signals appear at points I and II.

The signal A for example is divided in coupler 10 between ports 2 and 4 in the ratios specified above. Some portion of the signal A at point I is passed by coupler 12 to the output. The remaining part of signal A in line 14 is divided by coupler 11 between ports 2 and 4, the portion from port 4 appearing at point II where it couples to the output and the portion from port 2 returning to coupler 10, etc. It is unnecessary to burden the present disclosure with the series of divisions and redivisions which results since the mathematical description of such a loop is well known. By an analysis using the scattering parameters of the network components, or by successive addition of waves the signal at points I and II may be expressed as a series involving the coupling factors $\alpha$ and the phase shift $\phi_A$ of lines 13 and 14 for the signal A. Thus, in its compacted form:

$$A_I = j\,A\,[2\,\alpha \sin \phi_A / 1 - \alpha^2 e^{-j2\phi_A}]e^{-j\phi_A}, \quad (1a)$$

$$A_{II} = -\,[A\,(1-\alpha^2)/1 - \alpha^2 e^{-j2\phi_A}]e^{-j\phi_A}. \quad (1b)$$

Recall that coupler 12 will introduce a 90° phase lag as indicated by operating factor $-j$ to signal $A_{II}$ between ports 2 and 1 but not to signal $A_I$ between ports 4 and 1. Thus, the phase of equation (1*a*) represents the phase of signal $A_I$ in port 1 of coupler 12 and multiplication of equation (1*b*) by $-j$ produces the phase of signal $A_{II}$ in port 1. Since the phases of $A_I$ and $A_{II}$ are then the same in port 1, the amplitudes will be equal when:

$$[2\,\alpha \sin \phi_A / 1 - \alpha^2] = 1$$

or (2)

$$[1 - \alpha^2 / 2\alpha] = \sin \phi_A.$$

Now it will be noted that for $\alpha$ greater than zero, there are two values $\phi_A$ that satisfy equation (2), which values may be designated, respectively, $\phi_A = \phi_{OA}$ and $\phi_A = \pi - \phi_{OA}$. As $\alpha$ is made smaller, these values move closer together and converge when $\alpha = \sqrt{2} - 1$ for which $\phi_{OA} = \pi/2$ and $\sin \phi_{OA} = 1$. For values of $\alpha$ greater than $\sqrt{2} - 1$ and less than 1, there is a band over which equation (2) is not exactly satisfied, i.e., the signals at I and II are not exactly equal, and their failure to cancel completely produces a ripple across the band, the maximum amplitude of which occurs at $\phi_A = \pi/2$. At this point the power loss is $$P_L = \tfrac{1}{2}[(1-\alpha^2 + 2\alpha)^2/(1+\alpha^2)^2]. \quad (3)$$

Increasing $\alpha$ increases the ripple and also decreases, according to equation (2), the corresponding value of $\phi_{OA}$.

The equations for signal B are essentially the same as those for the signal A except that they are reversed as to terminals. Thus $$B_{II} = j\,B\,[2\,\alpha \sin \phi_B / 1 - \alpha^2 e^{-j2\phi_B}]e^{-j\phi_B}. \quad (4a)$$

$$B_I = -\,[B\,(1-\alpha^2)/1 - \alpha^2 e^{-j2\phi_B}]e^{-j\phi_B}. \quad (4b)$$

Coupler 12 again introduces a 90° phase lag as indicated by operating factor $-j$ to signal $B_{II}$ between ports 2 and 1 but not to signal $B_I$ between ports 4 and 1. Thus, the signal $B_{II}$ defined by equation (4*a*) will combine with signal $B_I$ of equation (4*b*) in port 1 of coupler 12 only if $$[2\,\alpha \sin \phi_{OB} / 1 - \alpha^2] = -1$$

or (5)

$$\sin \phi_{OB} = -[1 - \alpha^2 / 2\alpha].$$

Comparing equation (2) with equation (5) indicates that $$\sin \phi_{OA} = -\sin \phi_{OB}. \quad (6)$$

Figure 2:
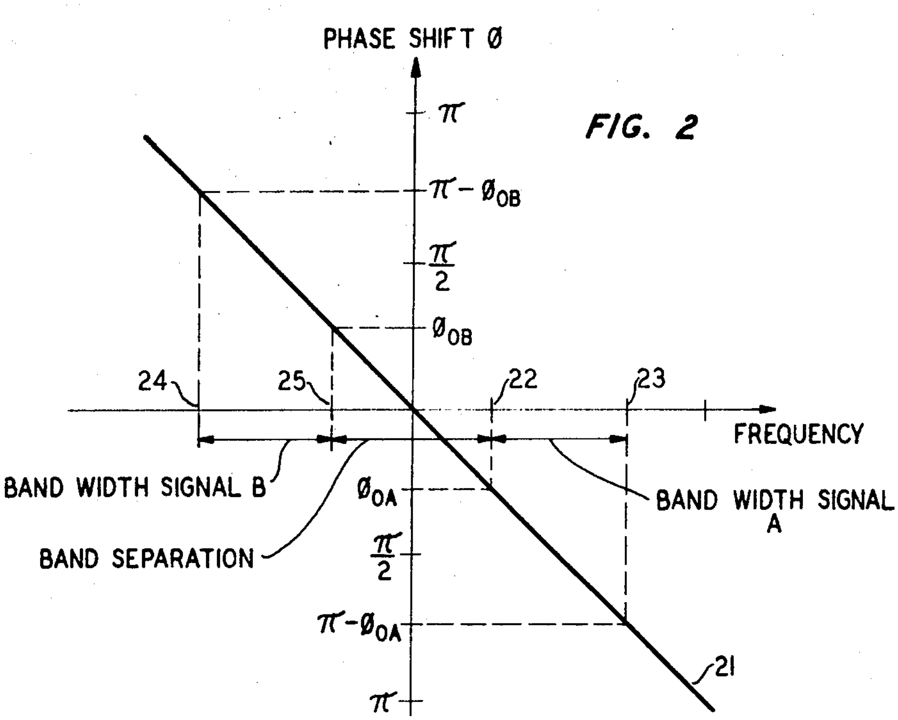
FIG. 2 is a phase versus frequency plot illustrating certain parameters and characteristics of the network of FIG. 1.

Equation (6) can be satisfied in the structure of FIG. 1 because $\phi$ is a function of frequency as shown in FIG. 2. In particular, characteristic 21 represents the phase versus frequency response of transmission lines 13 and 14 of FIG. 1, which have phase shifts that decrease as a linear function of frequency at a rate dependent upon the length of the particular transmission line. Defining the reference phase shift at the origin as zero for a frequency lying midway between bands A and bands B, the phase shift for the respective bands may be considered opposite in phase, i.e., positive in the fourth quadrant for the lower band B and negative in the second quadrant for the upper band A relative to origin phase.

Recall that the values for $\phi_{OA}$ and $\phi_{OB}$ are determined by the amount of ripple allowable as described above. FIG. 2 illustrates how these values also affect bandwidth, which for convenience is defined simply as the frequency spacing between points that satisfy equations (2) and (5); it being recognized that the usable bandwidth for a given ripple is somewhat wider. Thus, the lowest frequency in band A, as represented by point 22, is that frequency for which the phase shifts of lines 13 and 14 as determined by characteristic 21 are equal to $\phi_{OA}$. Similar projections to the abscissa determine the highest frequency as represented by point 23 of band A and the lowest and highest frequencies in band B as represented by points 24 and 25, respectively. The minimum spacing between the bands corresponds more or less to the frequency difference between points 25 and 22. FIG. 2 also shows why bandwidth and ripple are interrelated. Thus, increasing $\phi_{OA}$, for example, (corresponding to a decrease in $\alpha$ ) decreases the ripple, but also decreases the frequency spacing between points 22 and 23 and increases the separation between points 25 and 22. Thus, a larger ripple may be exchanged for wider bandwidth and vice versa.

Figure 3:
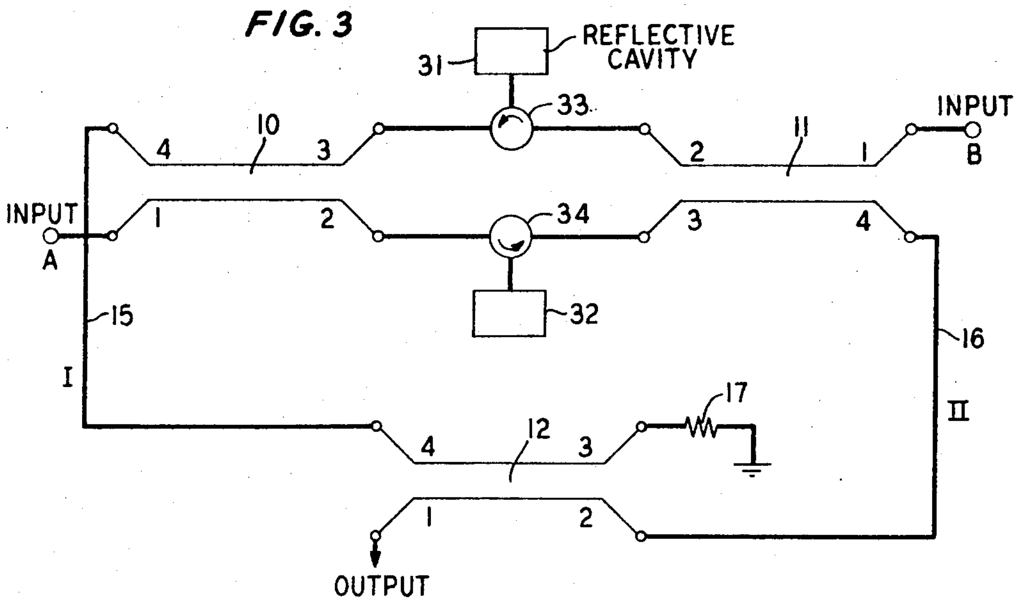
FIG. 3 is a schematic of a network in accordance with the invention.

Referring now to FIG. 3, the improved circuit in accordance with the invention is illustrated. Reference numerals corresponding to those employed in FIG. 1 have been used to designate corresponding components. Modification will be seen to reside in the inclusion of resonant cavities 31 and 32, respectively, in the transmission paths from port 2 to port 3 of each coupler 10 and 11.

Cavity 31 is coupled to its path by a circulator 33 having the direction of circulation represented by the arrow thereon such that power exiting port 2 of coupler 11 is directed to cavity 31 by the middle port of the circulator and reflections from the cavity are directed to port 3 of coupler 10. Similarly, power exiting port 2 of coupler 10 is directed by circulator 34 to cavity 32 and reflections from the cavity are directed to port 3 of coupler 11.

Cavities 31 and 32 may take the form of conductively bounded hollow resonators at UHF and microwave frequencies either single or multiple tuned and the lines connecting the cavity to the middle port of the circulator are selected in accordance with basic principles so that an open circuit appears to terminate the middle port at the resonant frequency. This defines a condition of zero phase shift between the input and output terminals of the circulator at the resonant frequency. Selection of this resonant frequency will be defined hereinafter. At lower frequencies, the resonant circuits may be lumped constant networks, either parallel or series resonant, or a combination thereof, provided the zero phase shift criteria at resonance as defined above is met.

The phase of signals reflected by either cavity 31 or 32 thus varies as an arc-tangent function of the operating frequency relative to the cavity resonance frequency such that for the fundamental resonance mode $$\phi = -2 \tan^{-1} 2Q (\Delta f/f_0) \qquad (7)$$

where Q is the cavity quality factor, $\Delta f$ is the difference between resonance and the frequency at which the phase is being determined and $f_0$ is the resonance frequency of the cavity. If $f_0$ is selected as the frequency midway between the bands A and B, the reflected phase shift can be shown as curve 41 of FIG. 4. The steepness of the curve is controlled by the Q of the cavity so that a given value of $\phi$ can be made to fall upon a desired off-resonance frequency within wide limits. Employing values of $\phi_0$ and, therefore, the same ripple as considered in FIG. 2, a comparison between the bandwidth obtained by the present invention and that of the prior art can be graphically made. Such comparison also serves to give a qualitative understanding of how the particularly shaped reflection-phase characteristic cooperates with the other parameters in the circuit to decrease the lowest frequency in band A, represented by point 42, and increase the highest frequency in the band, represented by point 43, for a given ripple. This result depends directly upon the arc-tangent function of curve 41 which increases the frequency spacing between the abscissa projection from curve 41 of points 42 and 43 for given $\phi$ points on the ordinate as compared with the corresponding projection of points 22 and 23 from the linear characteristic 21 of FIG. 2. Also, the required separation between the bands is decreased in FIG. 4 as compared to FIG. 2.

Figure 4:
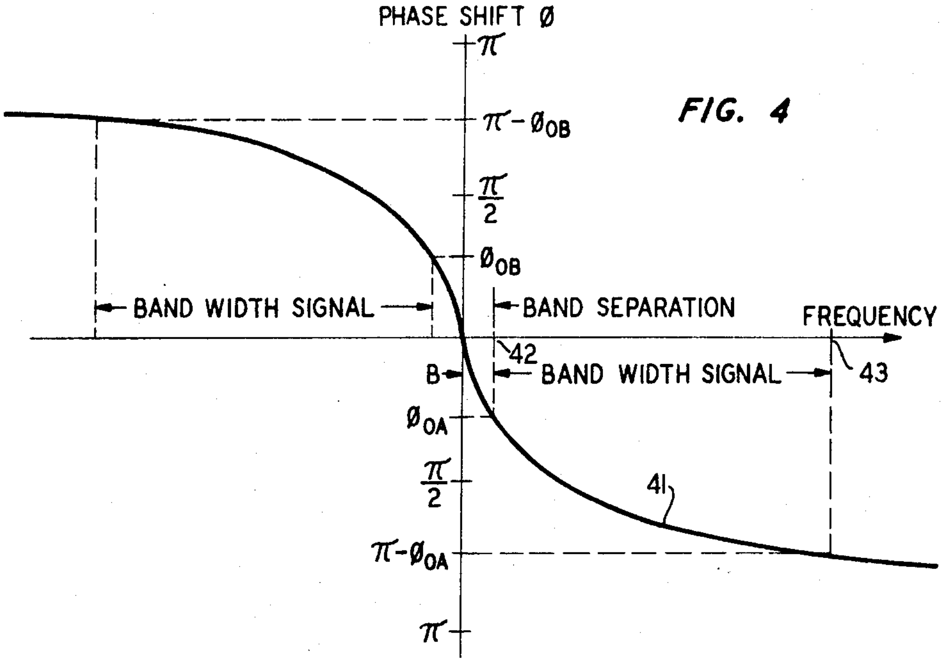
FIG. 4 is a phase versus frequency plot illustrating the improvements in characteristics rendered by the network of FIG. 3 in comparison to those characteristics in FIG. 2.

A practical embodiment of the present invention contemplates operation with values of $\phi_0$ in the order of 20° to produce ripples in the order of 1 dB. The proportions of FIGS. 2 and 4 have intentionally been exaggerated for tutorial purposes. A qualitative picture of the improvement made by the invention can be derived by recognizing that the ratio of the highest to lowest frequency boundaries of the band of FIG. 2 is approximately $$(f_{23}/f_{22}) = [\pi - \phi_0/\phi_0] \cong \pi/\phi_0 \qquad (8)$$

the approximation being for small values of $\phi_0$, while the same ratio of FIG. 4 is $$\frac{f_{43}}{f_{42}} = \frac{\tan\frac{\pi - \phi_0}{2}}{\tan\frac{\phi_0}{2}} = \simeq \frac{4}{\phi_0 2} \qquad (9)$$

the approximation being again for small values of $\phi_0$. Thus, the present invention as shown by FIG. 4 has increased the bandwidth by substantially $4/\pi\phi_0$ times the prior art bandwidth as shown by FIG. 2. For the specific $\phi_0 = 20°$, this increase amounts to four times the prior art bandwidth. In practice, allowing for a usable bandwidth out to the allowed ripple, there is a 6-fold increase in bandwidth over prior art.

Figure 5:
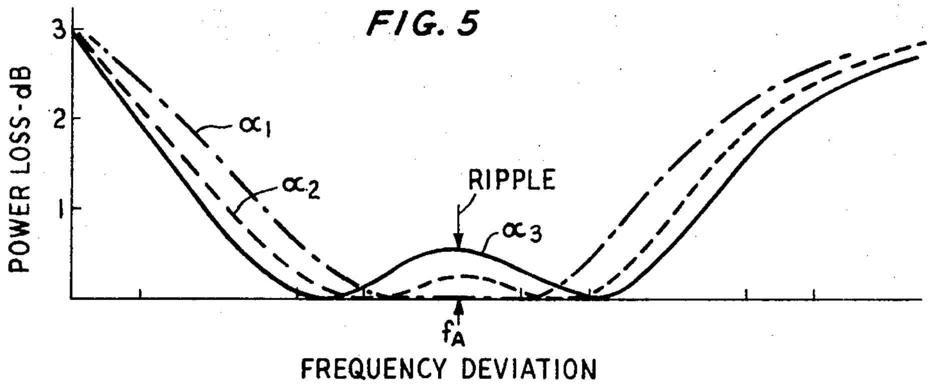
FIG. 5 is a typical set of power loss versus frequency deviation characteristics illustrating performance of the invention for different parameter values.

FIG. 5 illustrates typical combining bandpass characteristics by the use of plots of power loss versus frequency deviation (ratio of signal frequency deviation to the center resonant frequency of the cavities) for increasing coupling factors $\alpha_1$, $\alpha_2$ and $\alpha_3$. Note that a larger ripple appears for the wider bandwidths obtained with the largest values of $\alpha_3$, and that the smallest $\alpha_1$ decreases the ripple and decreases the bandwidth.

Figure 6:
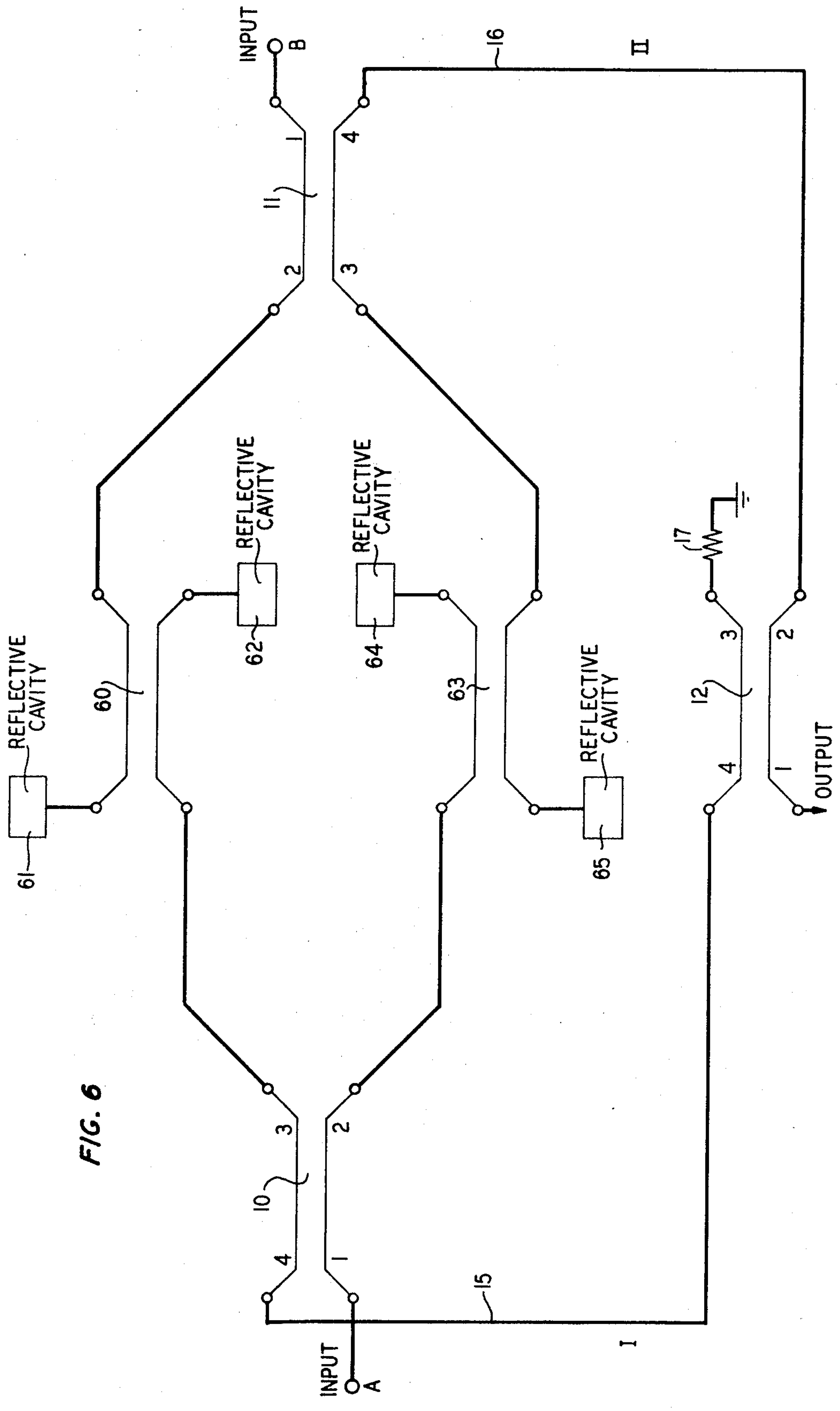
FIG. 6 illustrates an alternative configuration for a portion of FIG. 3.

While circulators represent the preferred method for abstracting the reflection characteristic from the resonant cavities, FIG. 6 illustrates how this may also be done by additional directional couplers or hybrids. Thus, FIG. 6 illustrates the components required to replace cavity 31 and circulator 33 in the connection between couplers 10 and 11. The replacing connection comprises a further coupler 60 having a 3 dB coupling ratio and having conjugate ports thereof coupled, respectively, to couplers 10 and 11. The remaining ports are each terminated by identical cavities 61 and 62. Thus, identical signals are applied to cavities 61 and 62 and identical reflections balance in the output port of coupler 60. Similarly, coupler 63 and cavities 64 and 65 replace circulator 34 and cavity 32.

The preferred embodiment of the invention has been specifically described in terms of coupled line directional couplers because their variable coupling factor allows the most freedom of design. Other forms of coupling networks having four ports and similar coupling properties can be used. It should be noted also that sum and difference coupling networks, generally known as hybrids, can be used to practice the invention. Their coupling factor is, of course, fixed at 3 dB.

What is claimed is:

1. In combination, first and second and third coupling networks each having a first port and a pair of coupled ports in coupling relationship to said first port and a further port in conjugate relationship to said first port, means for applying signals in different frequency bands respectively to the first port of said first and second networks, means for applying signals exiting one of the coupled ports of said first and second network respectively to a resonant circuit having the resonant frequency thereof midway between said bands, and means for coupling respectively reflections from each of said resonant circuits to the conjugate port of said first and second network, said third network having the coupled ports thereof respectively connected between the remaining coupled ports of said first and second network.

2. The combination according to claim 1 wherein the coupling factors of said coupling networks and the phase shift introduced by said resonant circuits are proportioned so that signals in said bands combine in phase in the remaining coupled port of said third hybrid at two spaced frequencies within both of said bands.

3. The combination according to claim 1 wherein said first and second coupling networks have a coupling parameter $\alpha$ and wherein said resonant circuits introduce a phase shift parameter $\phi$ to reflections therefrom, said parameters being proportioned so that $$[1 - \alpha^2/2\alpha] = \sin \phi$$

at two spaced frequencies within a first of said bands and $$[1 - \alpha^2/2\alpha] = - \sin \phi$$

at two spaced frequencies within the other of said bands.

4. In combination, first and second and third coupling networks each having a first port and a pair of coupled ports in coupling relationship to said first port and a further port in conjugate relationship to said first port, means for applying signals in different frequency bands respectively to the first port of said first and second networks, means connecting one of said coupled ports of each first and second network to said further conjugate port of the other, said connecting means including means for reflecting said signals from a resonant circuit having the resonant frequency thereof midway between said bands, said third network having the coupled ports thereof respectively connected between the remaining coupled ports of said first and second network, and means for receiving a signal combined from said different bands connected to the first port of said third network.

5. In combination, first and second and third coupling networks each having a first port and a pair of coupled ports in coupling relationship to said first port and a further port in conjugate relationship to said first port, a pair of circulators each having first, second and third ports in successive coupling relationship in the order named, each circulator having the first and third port thereof connecting one of said coupled ports of each first and second network to said further conjugate port of the other network, and resonant means terminating the second port of each circulator for reflecting signals coupled into said circulator second port back into said circulator second port, and said third network having the coupled ports thereof respectively connected between the remaining coupled ports of said first and second network.

* * * * *